United States Patent Office 2,731,165
Patented Jan. 17, 1956

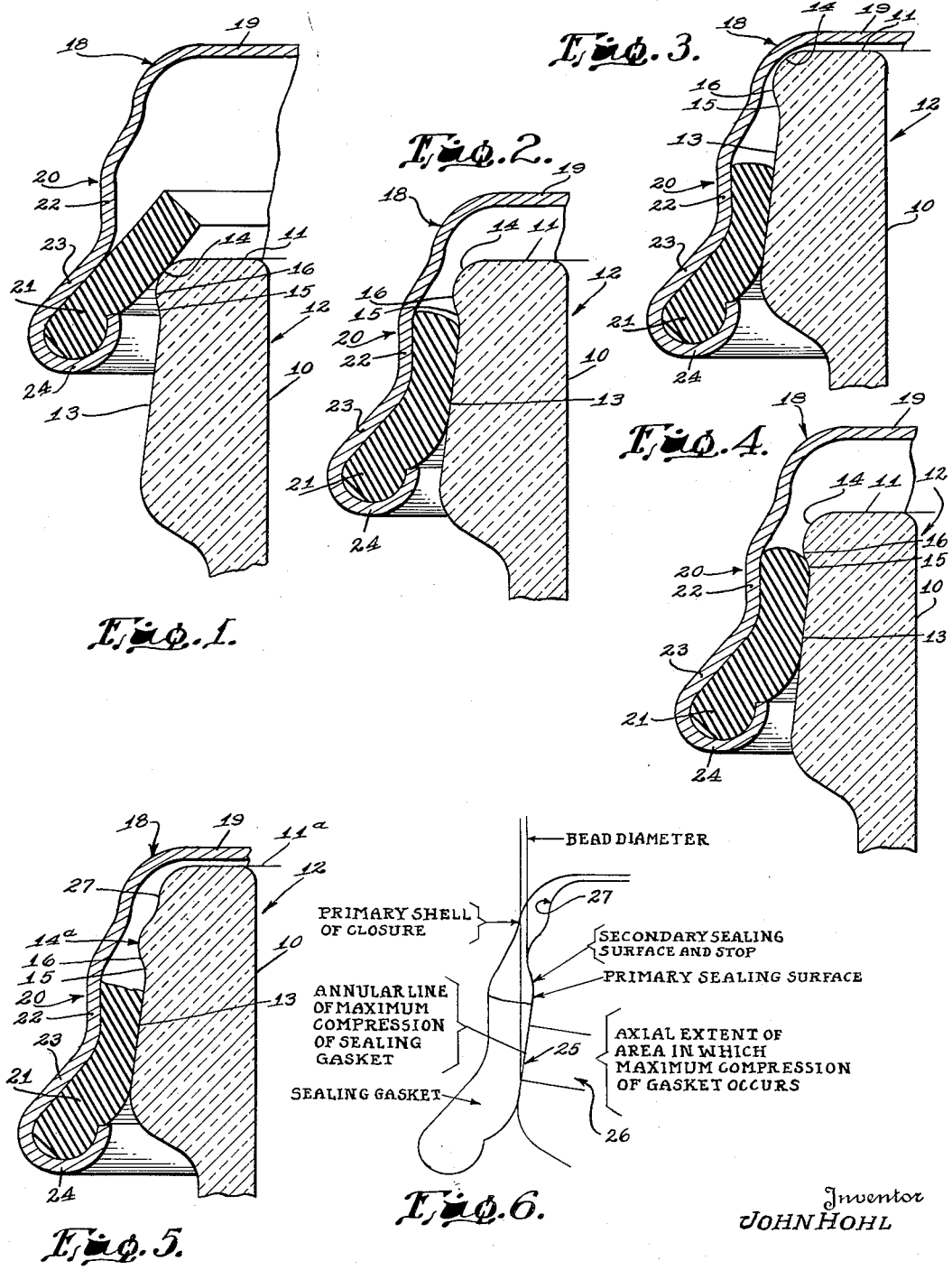

2,731,165

GLASS CONTAINERS AND CLOSURES FOR SAME

John Hohl, Toledo, Ohio, assignor to Owens-Illinois Glass Company, a corporation of Ohio Application June 3, 1953, Serial No. 359,259

5 Claims. (Cl. 215—40)

The present invention relates to glass containers and closures for the same and more particularly to packages in the so-called wide-mouth and semi-wide-mouth fields.

Further, the invention pertains specifically to packages in which sealing is effected by means of a sleeve-type gasket positioned between the skirt or flange, of a closure and an external side surface of the container in proximity to the mouth of the latter. This is commonly referred to as "side-sealing," as distinguished from "top sealing" in which the seal is between the top portion of the closure and annular top surface at the container mouth.

There are several extremely difficult problems involved in the development of a package which will satisfy all of the many rigid requirements imposed by the food packers and consuming public, and which are not satisfactorily met by present day containers and closures.

The package must be comparatively inexpensive and capable of withstanding retorting without breaking the seal. That is, the cap must be free to move axially outward under internal pressure, yet maintain a perfect seal during such movement and following return to its initial sealing position, after retorting. The closure must be capable of both easy anpplication for initial resealing and easy manual removal after initial resealing, the latter two steps to be effected without requiring the use of any mechanical devices or tools. Provision must also be made to compensate for dimensional and contour variations in the sealing surface of the container within allowable prescribed limits, while retaining the stated characteristics of easy application and manual removal, as well as positive sealing at all times.

The above requirements are not met satisfactorily and in some respects not at all, by any closures and containers of which I am aware.

At the present time there are several packages being offered to the packers, which packages are seriously deficient in most respects. The closures are difficult to apply in the first instance and if satisfactorily applied, are so difficult to remove that they are distorted and incapable of use as a reseal. If however, initial application is relatively easy of accomplishment, then the sealing effectiveness is unreliable and the caps frequently blow off during normal retorting or processing.

One of these is disclosed in White Patent #2,339,827 wherein the sealing surface on the jar is a straight cylinder and the cap, in the zone of effective sealing, is substantially a cylinder concentric with and spaced from said sealing surface. The sealing gasket must be of sufficient thickness to fill and seal this space and compensate for inherent variations in the glass diameter. For this reason the gasket is quite thick and consequently becomes an important factor in increasing the overall cost of the closure. In fact the sealing gasket is the most costly single element of the closure.

As stated, it must be thick enough to provide an adequate seal on a jar irrespective of whether the sealing surface is above, or below the prescribed circumference. Otherwise, with a small circumference sealing surface, the gasket will not effectively seal the container and the closure blows off readily, even under normal retorting pressure. On the other hand, an oversize sealing surface may prevent, or render exceedingly difficult, the initial sealing of the container and completely preclude any resealing by means of the original closure.

Another such package is that illustrated in Scofield Patent #1,989,428 wherein the glass has a sealing surface of generally straight cylindrical form and the closure carries a ring-type sealing gasket. Here again, as in the White patent, the gasket must be thick enough to properly seal a jar having a minimum diameter sealing surface as well as one of large diameter. The same deficiencies prevail as explained with respect to the White patent.

Thus, it is readily apparent that neither of the complete packages, nor the specific closures, in the above patents, is capable of performance in a fashion to meet the trade requirements explained heretofore.

The primary object of my invention is the provision of a container and closure which completely overcome the objections noted above and incorporate all of the advantages described heretofore, with regard to low cost, ease of initial sealing, as well as ready resealing and thereafter, removability of the closure by hand; ready compensation for normal allowable variations in sealing surface dimensions and shape and maintenance of a satisfactory seal during and following retorting, or processing, or otherwise.

In attaining the above objectives, my invention in general comprises a container having a primary sealing surface of frusto-conical form, merging at its upper margin through a curved surface with an annular stop, or retaining bead, the lower side of which bead, together with said curved surface, provides a secondary sealing surface designed for sealing contact with a sealing gasket incident to axially outward movement of the cap during retorting, or perhaps initially, as the normal sealing position, where the containers are not vacuumized. This retaining bead holds the closure on the container, both during retorting and in those instances where the product is filled or packed hot. Under such conditions the vapor pressure and liquid will tend to force the closure off of the container.

My invention also includes a closure specially designed for use with such container and comprising a skirt so shaped that a sealing gasket carried thereby will be subject to maximum compression along an annular line, or narrow band, which is of a diameter at least equal to the maximum diameter of the retaining bead immediately above the primary sealing surface. Also, the specific area of the primary sealing surface, within which said annular radial line of maximum compression occurs, is of sufficient axial extent to permit such maximum compression to take place along a line which is of greater diameter than the bead, irrespective of any permissible normal variations in the primary sealing surface dimensions. This applies particularly where the container is vacuumized and the closure is held by atmospheric pressure in the lowest position permitted by the sealing surface dimensions and contour.

My closure therefore so functions that during the period immediately following application and during the initial stages of retorting when the internal pressure is highest, the sealing gasket exerts its full or maximum resilience in maintaining a seal immediately beneath and on the lower surface of the retaining bead. During the cooling stage, the cap adjusts its position downward and in its final seated position, the inner diameter of the gasket approximates that of the retaining bead. Over a period of time, the gasket becomes slightly set, in consequence of which the retaining bead offers much less resistance to cap removal than originally, or at the time of initial application. Thus, the importance of the dimension relationship between the frusto-conical sealing surface and the retaining bead together with the closure design, in preventing initial blowing off of the closure, while permitting easy later removal, is apparent.

By reason of the foregoing, coupled with the provision that the upper inner margin of the sealing gasket is of slightly smaller diameter than the upper margin of the primary sealing surface, prior to application of the closure, the latter may be telescoped over the mouth of the container with a minimum of top pressure and effort comparable to a degree, with that needed in applying a top seal closure. Thus, breakage of glass is minimized and "rolling," or deformation (stretching) of the gasket, so that it "fights back" and tends to, or does, remove the cap incident to release of top pressure, is avoided.

A further important advantage of my structure is that the cap will not be displaced sufficiently to break the seal, by reason of internal pressure developed during normal retorting, or processing, because such pressure is applied uniformly over the entire inner surface of the cap and consequently, so moves the latter that the sealing gasket slides upwardly against all of the holding and secondary sealing surfaces of the bead.

Also, as a direct result of the specific relationship between the elements, as stated, the cap, when used as a reseal closure, can be applied easily and later removed manually with great ease and without the use of any tools. Such is due to the fact that as the cap is lifted at one side to slip the gasket upwardly over the bead, the gasket at other points is drawn into the space of upwardly increasing cross-sectional area directly beneath the bead. Thus, the cap shifts laterally sufficiently to permit the gasket to slide upwardly over the bead with very little lifting pressure.

Other objects will be in part apparent and in part pointed out hereinafter.

In the accompanying drawings:

Fig. 1 is a fragmentary sectional view showing my container and closure invention with the closure resting upon the mouth or rim portion;

Fig. 2 is a view similar to Fig. 1, but with the closure partially applied;

Fig. 3 is a view showing the closure fully applied and held in its lowermost position by vacuum;

Fig. 4 is a view showing the intermediate position of the closure during removal after the latter has functioned as a reseal;

Fig. 5 is a sectional view showing another form of my invention; and

Fig. 6 is a view showing schematically the relationship between the zone in which various possible annular lines of maximum compression of the sealing gasket on the primary sealing surface may occur and the retaining bead.

In that form of my invention shown in Figs. 1 to 4, the glass container comprises a wall 10 which terminates at its upper end in an annular rim 11, the latter defining a filling opening 12. In proximity to this rim 11, the exterior surface of the wall 10 is formed with a frusto-conical primary sealing surface 13. It has been determined that this sealing surface, in order to function properly, must be disposed at an angle between about 4° and 15° to the axis of the container. If it is less than about 4°, the essential characteristics heretofore explained are wholly unattainable, in that a thick gasket will be required and ready effective sealing and resealing, as well as removal of the closure after resealing will be exceedingly difficult to obtain as in the patents noted. In the event the angle is greater than about 15°, retention of the closure in sealing position may be difficult to maintain.

Immediately above the primary sealing surface 13 is an annular radial bead 14. This bead is generally arcuate in cross section. A curved surface 15 directed downwardly and inwardly connects the upper margin of the primary sealing surface 13 and a downwardly outwardly facing surface 16 of the bead. These surfaces 15 and 16 together, provide a combined secondary sealing surface and stop, or retaining bead, the functions of which are to prevent premature complete displacement of a closure and the maintenance of a seal under any normal conditions, including those frequently encountered during retorting, or processing.

The radius of the curved surface 15 very largely determines the amount of internal pressure which the closure can withstand without blowing off during retorting. The shorter the radius and therefore the more abrupt the lower side of the bead, the greater will be the resistance to such blow-off. Thus, it is important to avoid such a short radius that the gasket is so tightly held as to require excessive upward pressure to effect removal.

The closure 18 which is formed of sheet metal, comprises a circular top portion 19, a depending annular attaching skirt or flange 20, and a sleeve-type sealing gasket 21. The skirt includes a substantially cylindrical section 22 and a flared lower section 23 depending from the lower margin of said substantially cylindrical section 22. This flared lower section 23 is of frusto-conical form and is disposed at an angle to the axis of the closure greater than about 25°. This is important in minimizing the overall height of the closure, facilitating initial placement of the closure on the jar and general handling.

The sealing gasket 21 which may be formed of rubber, or some suitable rubber composition lies against the interior surface of the flared lower skirt section 23. The lower end of this skirt section is curled inwardly to form a hollow bead 24 which firmly grips the gasket and holds the same against bodily movement upwardly within the closure. This gasket projects a short distance upwardly beyond the juncture of the two skirt sections, 22 and 23, but terminates in a transverse plane lying below the upper margin of the lower fraction of the substantially cylindrical skirt section 22. The internal diameter of the upper end of this gasket, when the closure is unapplied to the container (Fig. 1), is somewhat less than the diameter of the upper margin of the primary sealing surface.

The annular line of juncture between the two skirt sections 22 and 23 together with a narrow annular band, or ring section 25, of the primary sealing surface, define a very narrow annular radial zone of maximum compression of the sealing gasket. This narrow band of the sealing surface must be within an axially extending circumferential zone 26 on the primary sealing surface, the upper annular margin of which zone is of a diameter at least equal to the maximum diameter of the retaining bead 14. This is important in that it facilitates easy application of the closure, both initially and as a reseal, as well as removal after reseal use. By reason of the described relationship between the bead, primary sealing surface, and said band, the gasket is subjected to maximum radial compression only incident to reaching some transverse plane within the zone 26 which is of greater diameter than the retaining bead, and where it normally is held by vacuum. The precise axial location of the plane of this line of maximum compression is determined by the dimensions of the container, viz., whether the primary sealing surface is precisely according to specifications, or over, or under, such specifications, in one or more directions, within prescribed acceptable limits. If said sealing surface is oversize, the line of maximum compression of the gasket will be somewhat higher than if this surface is below the prescribed dimensions. Thus, the inclination of the primary sealing surface at an angle in excess of about 4°, but no greater than about 15° to the axis of the container, assumes increasing importance. This factor is directly related to the bead diameter and the distance between the top portion 18 of the cap and juncture of the skirt sections. The distance between the top of the cap and juncture of the skirt sections must be substantially the same as, but no less than the distance between the rim of the container and the upper margin of that area of the primary sealing surface which is at least equal in diameter to that of the retaining bead. As a consequence, the annular line at which maximum compression of the sealing gasket occurs is always in a zone of greater diameter than the head.

Such tapering of the primary sealing surface 13, together with the substantially cylindrical form of the adjacent skirt section 22 of the closure provides an annular space of upwardly increasing cross-sectional area extending to the lower margin of the secondary sealing surface 15. Thus, both application and removal of the closure are facilitated, in that the lateral compression, or gripping, of the sealing gasket upon the primary sealing surface diminishes with increase in the axial distance between the circumferential zone 26 and the annular line of juncture between the skirt sections until the gasket engages the retaining bead.

Such decrease in compression, while sufficient to permit easy removal and reapplication of the closure, does not in fact break or lessen the effectiveness of the seal. The closure normally is held in its lowermost position by reason of vacuumization of the container. If however, during retorting, or processing, sufficient internal pressure is built up within the container, or for some other reason, vacuum is lost, or temporarily decreases sufficiently, the closure will move axially upward and bring the gasket into firm sealing engagement with the secondary sealing surfaces 15 and 16. In such position the upper portion of the gasket above the juncture of the two skirt sections is squeezed tightly in the annular space of upwardly diminishing cross-sectional area, between said secondary sealing surfaces 15 and 16 and the substantially cylindrical skirt section 22. Immediately below this annular space, the sealing gasket expands laterally and shortens longitudinally and as a consequence, strongly resists blowing off until the pressure approaches such degree as to be dangerous and likely to break the container.

Where the entire contents of the jar may not immediately be used and portions are left therein temporarily, the jar may be resealed by means of the original closure. In such event the closure is reapplied by hand so that the upper portion of the gasket snaps inwardly beneath the retaining bead and forms a perfect seal against the aforementioned secondary sealing surfaces and upper areas of the primary sealing surface. Removal of the closure, following reseal use, is easily effected manually, without the use of a tool of any character; such being accomplished by grasping the bottom of the skirt along one side and lifting same upwardly. This results in slight lateral shifting of the closure on the container, such being permitted by reason of the fact that the gasket in other sections, especially that diametrically opposite the zone in which the lifting pressure is applied, may be compressed into the space of minimum internal diameter immediately beneath the secondary sealing surface 15. Because of this condition, the closure is readily removable by hand, but as stated heretofore, cannot become displaced by normally expected and experienced internal pressure, because such is applied uniformly over the entire internal surface of the closure and simply serves to shift the entire cap axially and firmly press the gasket against the entire length and width of the secondary sealing surface.

In Fig. 5 I have shown another form of glass finish in which the retaining bead 14ª is spaced below the rim 11ª of the container and there is provided an annular, downwardly and outwardly curved, or flared, guiding surface 27 which aids in the application of the closure. This guiding surface is so shaped that initially the closure may rest upon and in part encompass said surface preparatory to the final application of the closure.

Modifications may be resorted to within the spirit and scope of the appended claims.

I claim:

1. In combination, a glass container having a side wall terminating in an annular rim defining a filling opening, the external surface of said wall having a downwardly flared frusto-conical primary sealing surface inclined to the axis of the container at an angle between about 4° and 15°, an annular external bead at the upper margin of the primary sealing surface, said bead being generally arcuate in cross section and merging with the primary sealing surface through the medium of an annular inwardly and downwardly curved surface, said curved surface and a contiguous downwardly and outwardly facing area of the bead constituting a secondary sealing surface and stop immediately above the primary sealing surface, the primary sealing surface having an annular maximum compression zone of at least the same diameter as the annular bead diameter, a sheet-metal closure comprising a circular top portion, an annular skirt depending from the top portion and including a substantially cylindrical section disposed at an angle between about 4° and 15° to said sealing surface and an outwardly downwardly flared annular section of frusto-conical form depending from said substantially cylindrical section, and a sleeve-type compressible sealing gasket secured within the flared section and having an upper terminal portion extending above the juncture of the two skirt sections, the skirt at the annular line of juncture of the two sections being positioned radially outward from said maximum compression zone when the closure is fully applied and together with a circumferential ring section of the primary sealing surface located at a point at which said ring section is of greater diameter than the maximum diameter of the bead, defining said annular zone of maximum compression of the gasket.

2. In combination, a glass container having a side wall terminating in an annular rim defining a filling opening, the external surface of said wall having a downwardly flared frusto-conical primary sealing surface inclined to the axis of the container at an angle between about 4° and 15°, an annular external bead at the upper margin of the primary sealing surface, said bead being of substantially arcuate outline in cross section and merging along its lower margin with the upper margin of the primary sealing surface through the medium of an inwardly downwardly and thence outwardly curved surface, said curved surface and a contiguous surface of the bead constituting a stop and secondary sealing surface, a sheet-metal closure comprising a circular top portion, an annular skirt depending from the top portion and including a substantially cylindrical section normally positioned at least in part radially outward from the primary sealing surface when the closure is in sealing position and providing with said surface an annular, sealing gasket accommodating space, of upwardly increasing cross-sectional area for a predetermined distance axially of the container and thereabove cooperating with the stop and secondary sealing surfaces in providing an annular space of upwardly diminishing cross-sectional area, an outwardly and downwardly flared lower section depending from said substantially cylindrical skirt section at an angle to the axis of the container greater than about 25°, a sleeve-type compressible sealing gasket lying against the inner surface of the flared skirt section and secured against bodily movement upwardly along the skirt, said gasket having an upper terminal portion extending above the juncture of said sections, the annular upper inner margin of the gasket, when the closure is unapplied to the container, being of lesser diameter than that of the upper margin of the primary sealing surface, the structure, as stated, being such that incident to upward axial movement of the closure away from a fully applied position, said terminal portion of the sealing gasket initially is subjected to progressively diminishing lateral compression until it enters said annular space of upwardly decreasing cross-sectional area and then in the latter area, is subjected to a maximum degree of lateral compression less than that applied at the annular line of maximum compression prior to initiation of said upward movement of the closure.

3. In combination, a glass container having a side wall terminating in an annular rim defining a filling opening, the external surface of said wall having a downwardly flared frusto-conical primary sealing surface inclined to the axis of the container at an angle between about 4° and 15°, an annular external bead at the upper margin of the primary sealing surface, said bead being of substantially arcuate outline in cross section and merging with the primary sealing surface through the medium of an inwardly and downwardly curved surface, said curved surface and a contiguous surface of the bead constituting a stop and secondary sealing surface, a sheet-metal closure comprising a circular top portion, an annular skirt depending from the top portion and including a substantially cylindrical section normally positioned at least in part radially outward from the primary sealing surface and therewith providing an annular sealing gasket accommodating space of upwardly increasing cross-sectional area for a predetermined distance axially of the container and thereabove cooperating with the stop and secondary sealing surfaces in providing an annular space of upwardly diminishing cross-sectional area, an outwardly and downwardly flared lower section depending from said substantially cylindrical skirt section at an angle to the axis of the container greater than about 25°, a sleeve-type compressible sealing gasket lying against the inner surface of the flared skirt section and secured against bodily movement upwardly along the skirt, said gasket having an upper terminal portion extending above the juncture of said sections, the annular upper inner margin of the gasket, when the closure is unapplied to the container, being of lesser diameter than that of the upper margin of the primary sealing surface, the structure, as stated, being such that incident to upward axial movement of the closure away from a fully applied position, said terminal portion of the sealing gasket initially is subjected to progressively diminishing lateral compression until it enters said annular space of upwardly decreasing cross-sectional area and then in the latter area, is subjected to a maximum degree of lateral compression less than that applied at the annular line of maximum compression prior to initiation of said upward movement of the closure, that area of the primary sealing surface in which maximum compression of the gasket occurs incident to vacuumization of the container being of a diameter at least equal to the maximum diameter of the retaining bead.

4. In combination, a glass container having a side wall terminating in an annular rim defining a filling opening, the external surface of said wall having a downwardly flared frusto-conical primary sealing surface inclined to the axis of the container at an angle between about 4° and 15°, an annular external bead at the upper margin of the primary sealing surface and spaced below the annular rim, said wall above the bead tapering downwardly and outwardly to form a guiding surface for a closure being applied to the container, said bead being substantially arcuate in cross section and merging with the primary sealing surface through the medium of an annular inwardly and downwardly curved surface, said curved surface and a contiguous surface of the bead constituting a stop and secondary sealing surface, a sheet-metal closure comprising a circular top portion, an annular skirt depending from the top portion and including a substantially cylindrical section normally positioned at least in part radially outward from the primary sealing surface and therewith providing an annular sealing gasket accommodating space of upwardly increasing cross-sectional area for a predetermined distance axially of the container and thereabove cooperating with the stop and curved surface in providing an annular space of upwardly diminishing cross-sectional area, an annular outwardly and downwardly flared lower section depending from said substantially cylindrical skirt section at an angle to the axis of the container greater than about 25°, a sleeve-type compressible sealing gasket lying against the inner surface of the flared section and secured thereto against bodily movement upwardly along the skirt, said gasket having an upper terminal portion extending above the juncture of said skirt sections, the annular upper inner margin of the gasket, when the closure is unapplied to the container, being of lesser diameter than that of the upper margin of the primary sealing surface, the structure as stated, being such that incident to upward axial movement of the closure away from a fully applied position, said upper terminal portion of the sealing gasket initially is subjected to progressively diminishing lateral compression until it enters said annular space of upwardly decreasing cross-sectional area and then in the latter area, is subjected to a maximum degree of lateral compression less than that applied at the annular line of maximum compression prior to initiation of said upward movement of the closure.

5. In combination, a glass container having a wall terminating in an annular rim defining a filling opening, the exterior of the wall, below a point in proximity to the rim being a downwardly flared frusto-conical surface inclined to the container axis at an angle between about 4° and about 15°, an annular bead of arcuate cross section immediately above the upper margin of the inclined surface, said bead having its lower annular margin merging with the adjacent margin of said frusto-conical surface through an inwardly downwardly and thence outwardly curved annular surface, a sheet-metal closure comprising a circular top portion, an attaching skirt depending from said top portion and including an annular substantially cylindrical section spaced radially outwardly from the frusto-conical surface and therewith forming an annular space increasing in cross-sectional area progressively upwardly toward said bead, an inwardly upwardly inclined annular section rising from the upper margin of said cylindrical section and together with the exterior surface of said wall providing an annular space the cross section of which diminishes progressively upward, an outwardly downwardly flared annular section depending from the cylindrical section, said flared section spaced radially outwardly from and together with the frusto-conical surface forming an annular space the cross-sectional area of which gradually increases downwardly from the point of juncture of the cylindrical and flared skirt sections and a sleeve-type sealing gasket secured within the flared section against independent bodily upward movement and having an upper terminal portion positioned between said cylindrical skirt section and the frusto-conical surface.

References Cited in the file of this patent

UNITED STATES PATENTS

| | | |
|---|---|---|
| 581,112 | Gunkle | Apr. 20, 1897 |
| 1,244,496 | Hammer | Oct. 30, 1917 |
| 2,079,813 | Podel | May 11, 1937 |
| 2,443,506 | Hohl et al. | June 15, 1948 |
| 2,492,144 | Gora | Dec. 27, 1949 |
| 2,628,735 | McGowan | Feb. 17, 1953 |